Figure 1:
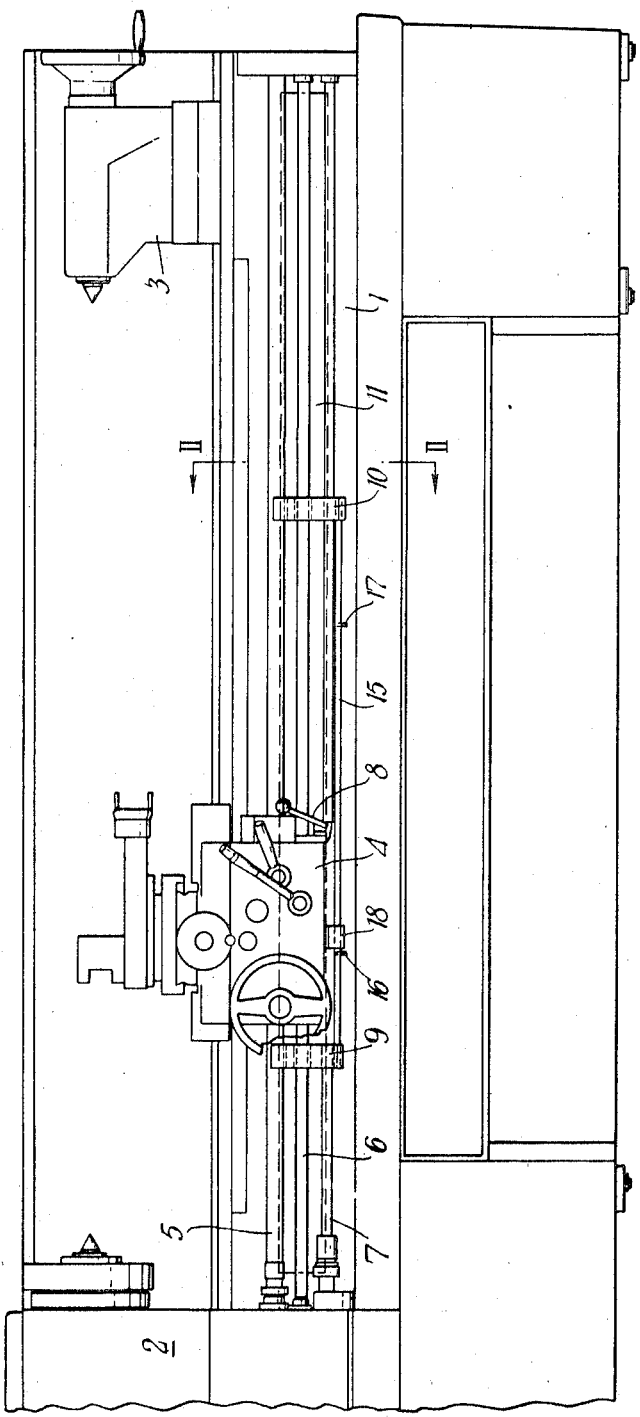

United States Patent
Moss

[15] 3,643,532
[45] Feb. 22, 1972

[54] SHAFT SUPPORT FOR LATHES

[72] Inventor: Eric Frank Moss, Braiswick, England

[73] Assignee: The Colchester Lathe Company Limited, Colchester, England

[22] Filed: May 21, 1970

[21] Appl. No.: 39,209

[30] Foreign Application Priority Data

May 27, 1969 England..............................26,750/69

[52] U.S. Cl......................................................................82/27
[51] Int. Cl.........................................................B23b 21/00
[58] Field of Search......................................................82/27

[56] References Cited

UNITED STATES PATENTS 2,885,920  5/1959  Livingston..............................82/27 X
2,612,070  9/1952  Hoelscher..................................82/27

*Primary Examiner*—Leonidas Vlachos
*Attorney*—Stevens, Davis, Miller & Mosher

[57] ABSTRACT

A lathe having a long feed shaft and lead screw in which such long shafts are supported against sagging and whirling by a shaft support assembly including a support beam mounted longitudinally on the lathe bed and two support brackets slidable along the support beam, the brackets being joined by a rod having stops engageable by a projection on the carriage so that the position of the carriage determines the position of the brackets to support the shafts remote from the carriage.

5 Claims, 2 Drawing Figures

SHAFT SUPPORT FOR LATHES

This invention relates to shaft supports for lathes.

In lathes which have long beds, the lead screw and feed shaft must necessarily be long. A problem then arises with high spindle speeds in that the lead screw and feed shaft are caused to whirl and this may be sufficiently violent to bend or otherwise damage the parts and, if fracture occurs, this may be dangerous. Even when at rest there is the problem that the lead screw and the feed shaft naturally sag in the middle where they are unsupported. These shafts therefore need supporting.

It has previously been proposed to eliminate sagging and whirling of the lead screw in a lathe by the use of fixed supports and it has also been proposed to attach an adjustable sliding bracket to the bed of that lathe, the lead screw passing through a bore in the bracket. The lathe operator then slides the bracket and clamps it in an appropriate position dependent on the nature of the operation to be performed.

The use of a fixed support for the lead screw results in either part of the length of the lead screw not being available for use or, if a support is used which surrounds half of or less than half of the lead screw, there is the possibility that the lead screw may whip out of its support. If an adjustable support is used, this necessarily involves the operator of the lathe in a further setting up operation and possibly a resetting of the support if a different operation is to be performed.

It is the main object of this invention to provide a shaft support for a lathe which is automatically positioned.

According to the present invention there is provided a shaft support for a lathe having a bed and a carriage, including a support beam positioned longitudinally on the lathe bed, at least two spaced support brackets, each bracket being supported by engagement with and slideable along the support beam and each bracket being adapted to support at least one shaft of the lathe, and means interconnecting the support brackets and the carriage of the lathe whereby the position of the carriage along the bed of the lathe over part of its travel determines the position of the brackets along the bed of the lathe to provide support for the shaft or shafts remote from the carriage.

The support brackets may be interconnected by a rod having stops thereon engageable by a projection on the carriage.

Figure 2:
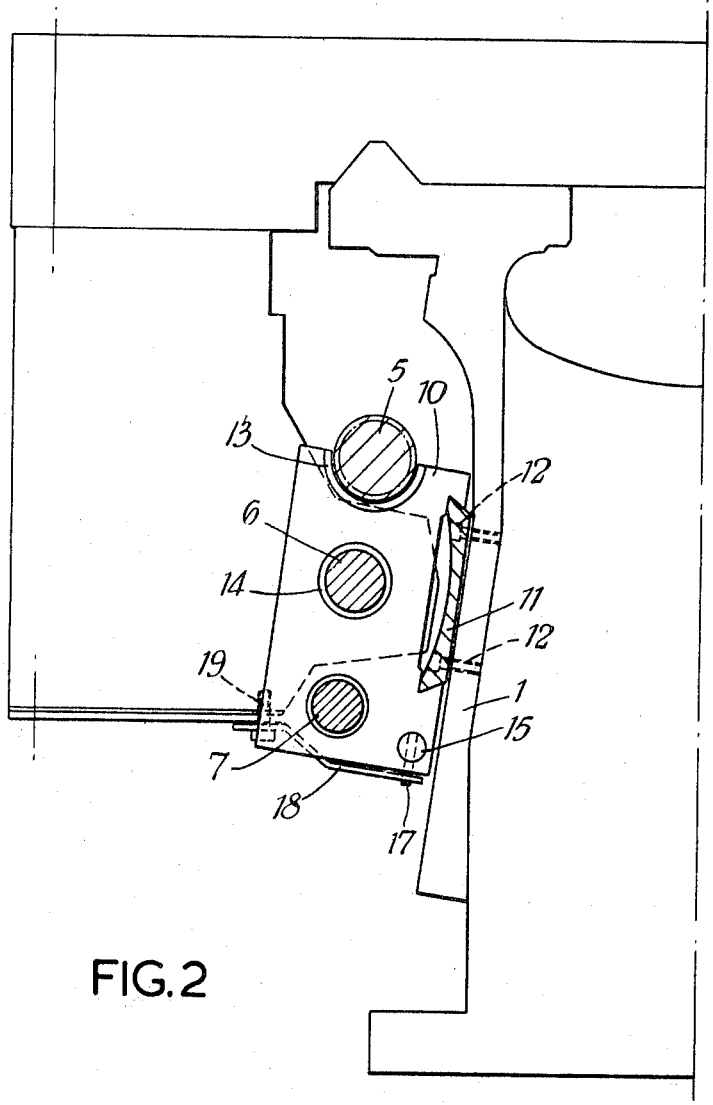

One embodiment of shaft support in accordance with the invention will now be described, by way of example only, and with reference to the accompanying drawings, in which FIG. 1, is a side elevation of a lathe having a shaft support in accordance with the invention fitted thereto and FIG. 2 is a sectional view on the line II—II of FIG. 1.

In the drawing, a long bed lathe of conventional construction includes a bed 1 with a headstock 2, a tailstock 3 and a carriage 4. The construction and operation of the lathe itself will be known to those skilled in the art and therefore not further description is necessary.

The lathe includes a lead screw 5, a feed shaft 6, and a third shaft 7 all of which extend longitudinally of the lathe and are sufficiently long so that, if they are not supported, they tend to sag. When the lead screw 5 and feed shaft 6 are driven at high speed, there is a tendency for these to whirl. The third shaft 7 is operated by lever 8 on the carriage 4 and controls the rotation of a chuck in the headstock 2.

With the carriage 4 in the position shown in the drawing, a substantial length of the lead screw 5 and feed shaft 6 will be unsupported and therefore a shaft support including two support brackets 9 and 10 are provided. As will be seen from FIG. 2, these support brackets 9 and 10 are in dovetailed engagement with a support beam 11 fixed to the bed 1 cf the lathe by bolts 12. Both of the support brackets 9 and 10 are slideable along the support beam 11.

So as to support the lead screw 5 and feed shaft 6, both the brackets 9 and 10 are provided with half bushes 13 which engage and support the lead screw 5 and bushes 14 which surround and support the feed shaft 6.

Interconnecting the support brackets 9 and 10 is a rod 15 having stops 16 and 17 thereon. These stops 16 and 17 are engageable by a plate 18 fixed to carriage 4 by bolt 19. As will be seen from FIG. 2, this plate 18 is attached to the carriage 4 in such a position that, as the carriage moves, the plate 18 will contact the stops 16 and 17 dependent on the direction of travel of the carriage 4.

As will be appreciated from the drawing, with the carriage 4 in the position shown in FIG. 1, the bracket 10 supports in approximately the midway position between the carriage and the tailstock end of the bed, the long lengths of lead screw 5 and feed shaft 6. If the carriage 4 is moved towards the tailstock, the plate 18 will eventually contact stop 17 and both brackets 9 and 10 will move with the carriage. The bracket 9 will then be moved to a position in which it supports the long lengths of lead screw 5 and feed shaft 6 between the headstock 2 and the carriage.

By use of the shaft support of the invention a long shaft liable to whip and sag may be automatically supported regardless of the position of the carriage and the lathe operator need not concern himself with the ship problem.

The mechanism may be modified from that described above, for example the rod which interconnects the brackets may be attached to the brackets at a position other than at their lower ends and it may be connected halfway up the brackets. Also, more than two brackets may be provided. Still further, the support brackets may be positioned by pneumatic or hydraulic devices controlled by microswitches actuated by the carriage position.

I claim:

1. A lathe having a bed and a carriage, additionally comprising a shaft support to provide support for a lathe shaft at a point remote from the carriage, said shaft support comprising:
   a support beam positioned on the lathe bed,
   a plurality of support brackets slidably engaging the support beam and each bracket at least partially supporting at least one shaft of the lathe,
   connecting means for cooperatively engaging the support brackets and the carriage, said connecting means comprising a joining member connecting at least two of said support brackets, two stops on said joining member, and a projection means on the carriage for engaging said stops along the path of travel of said carriage along said bed, for positioning said brackets along said bed.

2. The lathe of claim 1 wherein the two brackets connected by the joining member are located on opposite sides of the carriage.

3. The lathe of claim 2, wherein the stops and projection means are positioned so that when the carriage is one third of its path of travel along the lathe bed, measured from one end, a support bracket is approximately midway between the carriage and the other end of he lathe bed.

4. The lathe of claim 1, wherein each support bracket comprises:
   a half bush which engages and supports one shaft of the lathe and
   a bush which surrounds and supports a further shaft of the lathe.

5. A lathe having a bed and a carriage, additionally comprising a shaft support to provide support for a lathe shaft at a point remote from the carriage, said shaft support comprising:
   a support beam positioned on the lathe bed,
   a plurality of support brackets slidably engaging the support beam and each bracket at least partially supporting at least one shaft of the lathe,
   a joining means rigidly connecting at least two of said support brackets, which two brackets are located on opposite sides of the carriage, and means for cooperatively engaging said joining means and said carriage, for positioning said brackets along the lathe bed.

* * * * *